United States Patent [19]

Armanini

[11] 4,309,480

[45] Jan. 5, 1982

[54] IRON BLUE NACREOUS PIGMENTS

[75] Inventor: Louis Armanini, Pleasantville, N.Y.

[73] Assignee: The Mearl Corporation, Ossining, N.Y.

[21] Appl. No.: 125,653

[22] Filed: Feb. 28, 1980

[51] Int. Cl.$^3$ .......................... B32B 19/00; C09C 1/00
[52] U.S. Cl. .................................... 428/403; 106/291; 106/299; 106/300; 106/304; 106/308 B; 428/404
[58] Field of Search ............... 428/404, 403; 106/291, 106/304, 299, 300, 308 B

[56] References Cited

U.S. PATENT DOCUMENTS

| | | | |
|---|---|---|---|
| 3,087,827 | 4/1963 | Klenke et al. | 106/291 |
| 3,087,828 | 4/1963 | Linton | 106/304 X |
| 3,087,829 | 4/1963 | Linton | 106/291 |
| 3,951,679 | 4/1976 | Bernhard et al. | 106/291 |
| 4,047,969 | 9/1977 | Armanini et al. | 106/291 |

*Primary Examiner*—Thomas J. Herbert, Jr.
*Attorney, Agent, or Firm*—Ostrolenk, Faber, Gerb & Soffen

[57] ABSTRACT

An iron blue coated substrate nacreous pigment which yields less than ten parts per million of water-soluble cyanide due to the stability thereof to heat during drying is prepared by the admixing of the substrate, ferric ion reactant, and ferrocyanide reactant under conditions such that the ferric ion and ferrocyanide reactants are in substantially stoichiometric proportions and the pH is at constant value within the range of 2.5–4.0, and adding an aluminum-containing reactant so as to form aluminum hydroxide in addition to the iron blue on said substrate. The product shows a brighter, cleaner, and purer blue color than iron blue coated substrate products prepared by other procedures.

11 Claims, No Drawings

IRON BLUE NACREOUS PIGMENTS

BACKGROUND OF THE INVENTION

Iron blue was first discovered by Diesbach in 1704 and since that time it has been called by various names including Prussian blue, Milori blue, Chinese blue, Bronze blue, etc. These names have often indicated the shade of the iron blue ranging from a reddish to a greenish although many of these various names have lost their original meaning in recent times.

Iron blues are generally considered to have the composition $Fe_4[Fe(CN)_6]_3$ or $Fe(NH_4)Fe(CN)_6$, depending on the method of manufacture. In the usual method preferred by industry in which the iron blue is not precipitated on a substrate, a solution of sodium ferrocyanide is reacted with ferrous sulfate in the presence of ammonium sulfate to form Berlin white which is then digested in sulfuric acid and oxidized with sodium bichromate or chlorate to iron blue.

For cosmetic applications, it is preferred to have the iron blue highly adherent to the surfaces of a nacreous pigment substrate in order to prevent migration of color under use conditions. For example, by combining the absorbing iron blue pigment with a yellow colored nacreous pigment, a green product can be obtained. However, merely blending the iron blue pigment with a nacreous pigment results in a product in which the iron blue is not held on the surfaces of the pigment, and migration with its resulting color changes occur.

In U.S. Pat. No. 3,951,679, it is pointed out that the conventional precipitation of absorption pigments onto nacreous pigments is unsuitable for a precipitation of iron blue because the latter forms colloidal deposits during direct precipitation, which adhere only partially or not at all on the flakes of the nacreous pigment. This leads to non-reproducible batches, to considerable difficulties during filtering, and most particularly, to a lack of nacreous effect. In order to cause iron blue to adhere to the surfaces of the nacreous pigment, the patent teaches using the device of coating an iron blue precursor on the nacreous pigment and then converting the precursor to iron blue. The precursor is a low solubility iron (II) compound since trivalent compounds are stated to lead to colloidal deposits.

The difficulties in using ferric salts were overcome in Armanini and Johnson U.S. Pat. No. 4,047,969, assigned to the assignee of the present invention. Iron blue is directly and adherently precipitated to a substrate by the addition of ferric ions to a ferrocyanide solution and adjustment of the pH.

Recently, the United States Food & Drug Administration has provided specifications concerning certain impurities in iron blue pigments. Among these specifications is a limitation that iron blue must not contain more than 10 ppm of water-soluble cyanide. Adsorption of the ferrocyanide ion can cause high cyanide levels, and the ferrocyanide ion is very easily adsorbed by iron blue because of its large negative charge. The amount adsorbed can be on the order of 0.6-0.8 mole per mole of metal ferrocyanide. This high adsorption capacity has caused great difficulty in elucidating the structure of the iron blue and defining its exact composition. In many cases, the adsorption, not only of ferrocyanide but often of other ions, is so high that the formulas which are given are only approximations of the true compositions. If the ferrocyanide ion $[Fe(CN)_6]^{-4}$ is desorbed, it can be oxidized to the ferrocyanide ion $[Fe(CN)_6]^{-3}$ which readily breaks down to form cyanide.

Manufacturers who precipitate iron blue without the presence of any substrate usually do not have difficulties in meeting the soluble cyanide specification of 10 ppm maximum. However, those manufacturers who precipitate iron blue on a substrate, especially on mica or titanium dioxide-coated mica, have had great difficulty in meeting the soluble cyanide specification for a number of reasons.

The iron blue is generally coated at a concentration of 1 to 10% on a substrate that has an extremely large surface area. The result is that the iron blue is formed in essentially a thin film and also has a large surface area. Accordingly, any reactions in which iron blue will participate can occur very rapidly with the iron blue substrate.

Iron blue is heat sensitive, and at high temperatures, it breaks down to cyanide and iron oxide. While the decomposition of iron blue is usually given as 150° C., some very slight decomposition can take place at much lower temperatures. For this reason, the conventional drying of iron blue is generally carried out at about 30° C. for very long periods of time, which is not practical in current pigment manufacture.

Iron blue always retains a certain amount of water, both adsorbed water and water of hydration, which it loses only at high temperatures. The presence of the small amounts of water appears to stabilize the iron blue structure. However, in the case of iron blue coatings on high surface area substrates, there are indications that the water is lost very rapidly and once lost, the breakdown to cyanide proceeds.

It will be appreciated that since the coating of iron blue on the high surface area substrates is only on the order of 1-10%, it is difficult to dry the pigment thoroughly and at the same time leave the small amounts of water necessary for stabilization. Generally, all of the water is lost because of the high surface area, and decomposition begins readily.

Additionally, iron blue is very complex in chemical structure, and some of its properties are not understood. For example, the very slight decomposition which iron blue shows under certain conditions and in some media at ambient and elevated conditions are not understood. Under some conditions, a slight amount of decomposition of iron blue leads to an increase in water-soluble cyanide.

The preparation of iron blue-coated nacreous pigments as described in U.S. Pat. Nos. 3,951,679 and 4,047,969 do not result in products meeting the 10 ppm water-soluble cyanide requirement.

It is accordingly the object of this invention to provide a new iron blue-coated nacreous pigment and a method for its production whereby the requirement of 10 parts per million or less of water soluble cyanide is achieved. This and other objects of the present invention will become apparent to those skilled in the art from the following detailed description.

SUMMARY OF THE INVENTION

This invention relates to an iron blue coated nacreous pigment having less than 10 parts per million of water-soluble cyanide and the method by which it is produced. The method of production is such that the iron blue is relatively stable to heat so that practical drying of the pigment can be carried out. The pigment itself is produced by the admixing of the substrate, ferric ion reactant, and ferrocyanide reactant so that the reactants are always present in substantially stoichiometric proportions, while maintaining a constant pH within the range of 2.5–4.0, and adding an aluminum-containing reactant so as to form aluminum hydroxide in addition to the iron blue on the substrate. The iron blue coated nacreous pigment prepared according to this invention which exhibits the improved water-soluble cyanide stability also surprisingly exhibits a clean and bright blue color superior to other pigments of same approximate composition prepared by other methods.

DESCRIPTION OF THE INVENTION

The objects of this invention are achieved by reacting the iron blue forming reactants in the presence of the substrate under conditions that the reactants are substantially always present in stoichiometric proportions and the pH is at a constant value within the range of 2.5–4.0 and by forming an aluminum hydroxide coating on the pigment simultaneously or subsequently to the formation of the iron blue coating thereon.

The subtrate to be coated with the iron blue can be mica of appropriate size and shape for forming nacreous pigments or such mica which has a calcined layer of a metal oxide on its surfaces. Such metal oxides include, for example, titanium dioxide, zirconium dioxide, ferric oxide, and the like. The metal oxide coated mica nacreous pigments are well known in the art and can be prepared, for example, by the procedure set forth in U.S. Pat. Nos. 3,087,828 and 3,087,829, the disclosures of which are hereby incorporated by reference.

The ferrocyanide can be any soluble ferrocyanide. The preferred ferrocyanides are the water-soluble alkali metal and alkaline earth metal hexacyanoferrates e.g., $Na_4Fe(CN)_6$, $K_4Fe(CN)_6$, $[NH_4]_4Fe(CN)_6$, as well as the corresponding calcium and strontium salts. Potassium hexacyanoferrate is the preferred ferrocyanide.

Any soluble ferric compound can be used as the source of ferric ions. Thus, ferric chloride, ferric sulfate, and the like can be used. On the basis of availability, ferric chloride is the preferred ferric salt.

The substrate, ferrocyanide, and ferric salt are contacted in an aqueous medium. It is most convenient to separately prepare an aqueous slurry of the substrate, an aqueous solution of the ferrocyanide, and an aqueous solution of the ferric salt which are then appropriately mixed. The concentration of the slurry and solutions are not critical and can be varied as desired. In general, the substrate slurry contains about 5–25% substrate, preferably about 15–20%; the ferrocyanide concentrate solution is about 5–25%, preferably about 15–20%, ferrocyanide; and the ferric compound concentration is about 5–40%, preferably about 15–20% of the solution.

The formation of the iron blue can be effected at any temperature from ambient to reflux although temperatures of about 65°–75° C. are preferred. The ferrocyanide and ferric salts cannot be added to the substrate slurry sequentially nor can one reactant be added to the other, but they must be added simultaneously and in stoichiometric proportions. A slight error of 5% or less can be tolerated as long as the error is in favor of excess ferric ion in order that the possibility of ferrocyanide ion absorption is small. The time for precipitation is not restricted and usually is completed in about 0.1–1 hour.

The amount of iron blue which is deposited on the substrate can vary from about 0.1% to 10%. In most cases, the amount deposited will be about 1% and 5% because of the intense blue color provided by the iron blue.

The pH at which the iron blue is precipitated must be maintained substantially constant and at a value within the range of 2.5–4.0. At pH values below 2.5 or above 4.0, the iron blue does not adhere firmly to the substrate surfaces and the iron blue particles can be washed away and separated from the substrate. It has been found that best results are obtained at a pH of about 3.0. If the pH is not maintained substantially constant, it has been noted that high cyanide values result. The pH can be regulated by simultaneously adding a suitable base, such as sodium hydroxide, to the reactants with or without a buffer.

In order to realize the objects of the invention, the iron blue-coated nacreous pigment must be coated with aluminum hydroxide. The aluminum hydroxide coating porcedure can take place simultaneously with the formation of the iron blue or can be effected in a subsequent processing step. If the aluminum hydroxide coating is a subsequent step, the iron blue-coated particles can be filtered but should not be washed before the aluminum hydroxide coating is effected. The aluminum hydroxide coating procedure is carried out by procedures well known in the art, by adding a hydrolyzable aluminum compound such as aluminum chloride to the pigment under conditions where the aluminum salt hydrolyzes. The aluminum hydroxide coating is carried out so as to provide an amount of aluminum of about 1.0 to 7%, preferably about 5.5–6.5%. Larger amounts of aluminum hydroxide can be tolerated but the aluminum hydroxide adds whiteness to the blue color of the iron blue and when the amount of the aluminum hydroxide becomes too large, the whitening effect can become objectionable.

After the precipitation of the iron blue and treatment with the hydrolyzable aluminum salt, the pigment must be dried. While the pigment can be filtered and the supernatant liquid withdrawn, the pigment cannot be washed before the drying step. High water-soluble cyanide values result if the pigment is washed before drying, and it is believed that such a washing step results in the hydrous aluminum oxide being removed from the substrate surfaces. The drying is carried out at a temperature sufficiently high to drive off extraneous water but not high enough to cause decomposition of the iron blue. A temperature of about 30°–100° C., preferably about 40°–70° C. is normally employed. The drying period generally ranges from about 1–15 hours. For example, the drying can be carried out in a heated oven at 50° C. for an overnight period or in a forced air circulating oven maintained at the same temperature. Also, the pigment can be successfully spray-dried once the correct parameters of the spray-drying process are identified so as to prevent overheating of the pigment. One of the significant advances provided by the present invention is that various preparation steps can be carried out at elevated temperatures instead of at ambient temperatures as in the prior art, and the resultant product exhibits enchanced heat stability.

It has been found that as a result of the procedure described above the iron blue actually coats the surfaces of the substrate and is held firmly to those surfaces. When the coated platelets are dispersed and allowed to settle, either in distilled water or in nitrocellulose lacquers which require some grinding action for dispersion, no bleeding of the iron blue from the substrate is observed. The supernatant liquids are completely clear, and all the iron blue is held firmly on the substrate surfaces.

A reliable and reproducible procedure for determining the amount of water-soluble cyanide involves the dispersing of 5.00 grams of the sample to be tested in 100 ml of distilled water which is then placed on a roller or shaker for 5 minutes to effect good dispersion. The slurry is then filtered through a 0.025 u pore size Millpore filter into a flask which contains 1.00 grams of NaOH pellets. The sodium hydroxide is present to insure that any water-soluble cyanide present is not lost during the filtration. The total time for filtration and hence contact time is generally one hour. The sample is shaken during the filtration to assure complete dissolution of the sodium hydroxide. The sample is then analyzed for water-soluble cyanide by the method given in the 14th edition of "Standard Methods for the Examination of Water and Wastewater", page 370, 413D Colormetric Method. Briefly, a 10 ml sample of the water extract is pipetted into a 50 ml volumetric flask followed by 10 ml of 0.25 N NaOH, 15 ml of phosphate buffer solution, 2 ml of chloramine T solution, and 5 ml of pyridine barbituric acid solution. The sample is shaken, and the color allowed to develop for 8 minutes, after which the absorbancy is measured by using a spectrophotometer at a wavelength at 578 nm. This method is sensitive to cyanide to less than one part per million.

The following examples are set forth in order to further illustrate the invention. All parts and percentages are by weight, and all temperatures are in degrees centigrade throughout the specification and claims unless otherwise indicated.

EXAMPLE I

Two hundred grams of a blue-reflecting titanium dioxide coated mica interference pigment were dispersed in 800 ml of distilled or deionized water and placed in a suitable vessel which could be stirred and heated. The slurry was heated to 70° C. and maintained at this temperature throughout the iron blue deposition procedure.

The pH was adjusted to 3.0 using a solution of 12.1 molar HCl diluted 1:1 by volume with distilled water. Then 15 ml of a solution containing 39% $FeCl_3$ diluted 1:1 by volume with distilled water were added at a rate of 0.75 ml/min. while simultaneously adding 40 ml of an 18% w/w solution of $K_4Fe(CN)_6 \cdot 3H_2O$ at a rate of 2 ml/min., while at the same time maintaining the pH constant at 3.0 by the simultaneous addition of a 10% sodium hydroxide solution. Thereafter, 100 ml of a 10% $AlCl_3 \cdot 6H_2O$ solution were added over 20 minutes while still maintaining the pH constant at 3.0 by the addition of 10% sodium hydroxide.

The pigment was filtered on a Buchner funnel and the mother liquor removed. The pigment was then dried in an air oven maintained at 50° C. overnight. When tested for water-soluble cyanide, it was found that there was less than 10 ppm based on the weight of the iron blue.

EXAMPLE II

Two hundred grams of a green-reflecting titanium dioxide-coated mica which had an additional layer of 5.4% $Fe_2O_3$ coated over the $TiO_2$ were dispersed in 800 ml of distilled or deionized water and placed in a suitable vessel which could be stirred and heated. The slurry was heated to 70° C. and maintained at this temperature.

The pH adjusted to 3.0 using a solution of 12.1 molar HCl diluted 1:1 by volume with distilled water. Then 11.1 ml of a solution containing 39% $FeCl_3$ diluted 1:1 by volume with distilled water were added uniformly over a period of 20 minutes while simultaneously adding 29.6 ml of an 18% w/w solution of $K_4Fe(CN)_6 \cdot 3H_2O$ over 20 minutes while maintaining the pH constant at 3.0 by the simultaneous addition of a 10% sodium hydroxide solution. After the addition was complete, the slurry was stirred for 0.5 hour. Thereafter, 100 ml of a 10% $AlCl_3 \cdot 6H_2O$ were added over 20 minutes while maintaining the pH constant at 3.0 by the addition of a 10% sodium hydroxide solution.

The pigment was filtered on a Buchner funnel and the mother liquid removed. The pigment was then dried in an air oven maintained at 50° C. overnight. The pigment displayed an intense green color because the yellow color of the $Fe_2O_3$ combined with the blue color of the iron blue to produce a green. When tested for water-soluble cyanide, it was found that there was 3.7 ppm based on the weight of the iron blue.

EXAMPLE III

This example illustrates the high cyanide levels which are encountered when the reactants are not added simultaneously.

Two hundred grams of a blue-reflecting titanium dioxide-coated mica were dispersed in 800 ml of distilled water and placed in a suitable vessel which could be stirred and heated. Forty ml of an 18% w/v solution of $K_4Fe(CN)_6 \cdot 3H_2O$ were then added and the slurry brought to reflux before adding 20 ml of a 1:1 volume:volume solution of 39% $FeCl_3$ and distilled water over a period of 20 minutes. The slurry was allowed to cool to room temperature and the pH adjusted to 4.0 using a 3.5% sodium hydroxide solution in distilled water. The pigment was then filtered on a Buchner funnel and washed with 4 liters of distilled water. The pigment was dried at 50° C. overnight. When tested for soluble cyanide, a value of 37 ppm, based on the iron blue content was found.

EXAMPLE IV

This example illustrates the fact that the iron blue can be coated on a mica substrate producing a blue color which is firmly attached to the substrate.

100 grams of a classified mica having most of its particles between 10 and 35 u and having a surface area determined by the BET method of 3.2 $m^2/g$ were dispersed in 800 ml of distilled water. The slurry was heated to 70° C. The pH was adjusted to 3.0 using a solution of 12:1 molar HCl diluted 1:1 by volume with distilled water. Then 15 ml of a solution of 39% $FeCl_3$ diluted 1:1 by volume with distilled water were added at a rate of 0.75 ml/min. while adding 40 ml of an 18% w/v solution of $K_4Fe(CN)_6 \cdot 3H_2O$ at 2 ml/min. and at the same time maintaining the pH constant at 3.0 by the addition of a 10% sodium hydroxide solution. After the addition was complete, the slurry was stirred for 0.5 hour. Thereafter, 100 ml of a 10% $AlCl_3 \cdot 6H_2O$ solution was added over 20 minutes while maintaining the pH constant at 3.0 by the addition of 10% sodium hydroxide.

The pigment was filtered on a Buchner funnel and air dried at 50° C. overnight. No water-soluble cyanide was detected.

The pigment exhibited in air a good blue color. When the pigment was dispersed in water or in nitrocellulose lacquer and allowed to stand, no separation of the blue color from the substrate was noted.

EXAMPLE V

This example illustrates the effect on soluble cyanide of adding aluminum chloride in smaller quantities or not at all.

The procedure of Example I was followed. After the iron blue was precipitated and allowed to stir for 0.5 hour, the slurry was divided into parts and equivalent quantities of aluminum chloride solution were added. The pigment was then processed as in Example I and tested for soluble cyanide. When no aluminum chloride was added, soluble cyanide was found to be 54 ppm. When one-half the amount of aluminum chloride added in Example I was added, soluble cyanide was 14 ppm and when three-fourths of the amount was added, soluble cyanide was 9.6 ppm; all ppm value are based on the iron blue content.

EXAMPLE VI

This example illustrates the effect of pH upon the soluble cyanide level.

The exact procedure of Example I was followed three times except the pH during the iron blue precipitation was held constant at values of 3.0, 4.0, and 5.0, respectively. At 3.0, a soluble cyanide value of 6.7 ppm resulted. At 4.0, a value of 7.4 ppm, and at pH 5.0, a soluble cyanide value of 17 ppm resulted.

EXAMPLE VII

This example shows that the improved iron blue nacreous pigment can be successfully spray dried without causing an increase in soluble cyanide.

The procedure of Example I was followed exactly. After removing the filtrate on the Buchner funnel, the pigment was redispersed in distilled water to a concentration of 20%. The slurry was then spray dried using a Niro Atomizer Type 53 Portable Minor Spray Dryer. The inlet temperature was maintained at 155° C. and the outlet temperature varied. The fractions collected at the various outlet temperatures were tested for soluble cyanide. The values found are shown in Table I.

TABLE I

| Spray Drying of Improved Iron Blue Nacreous Pigment | | | |
|---|---|---|---|
| Sample | Inlet Temp. | Outlet Temp. | ppm CN |
| A | 155° C. | 97–87° C. | 68 |
| B | 155° C. | 87–79° C. | 38 |
| C | 155° C. | 79–70° C. | 13.3 |
| D | 155° C. | 70–64° C. | 2.8 |
| E | 155° C. | 64–56° C. | 2.8 |

It is seen that as long as the outlet temperature was maintained below 70° C., acceptable cyanide levels were obtained. The powders at 70° C. and below were perfectly dry and could be incorporated into any film-forming medium without difficulty.

EXAMPLE VIII

The procedure of Example I was followed except that the $AlCl_3$ solution was added simultaneously with the ferric chloride and potassium hexaferrocyanide. A clean and bright blue pigment was realized.

Various changes and modifications can be made in the process and products of this invention without departing from the spirit and scope thereof. The various embodiments which have been set forth herein were for the purpose of further illustrating the invention but were not intended to limit it.

What is claimed is:

1. An iron blue coated nacreous pigment substrate of less than 10 ppm water soluble cyanide.

2. The iron blue coated substrate of claim 1 including an aluminum hydroxide coating.

3. The iron blue coated substrate of claim 2 wherein the iron blue coating is about 0.1–10% of the iron blue coated substrate.

4. The iron blue coated substrate of claim 2 wherein the amount of iron blue is about 1–5%.

5. The iron blue coated substrate of claim 2 wherein the substrate is $TiO_2$ coated mica.

6. A method of preparing an iron blue coated nacreous pigment substrate of less than 10 ppm water soluble cyanide comprising admixing the substrate, ferric ion reactant and ferrocyanide reactant under conditions such that the ferric ion reactant and ferrocyanide reactant are always substantially in stoichiometric proportions and the pH is at a constant value within the range of 2.5–4.0, and adding an aluminum containing reactant so as to form aluminum hydroxide in addition to the iron blue on the substrate.

7. The method of claim 6 wherein said pH is about 3.0.

8. The method of claim 6 wherein the aluminum containing reactant is added simultaneously with the ferric ion reactant and ferrocyanide reactant.

9. The method of claim 6 wherein the aluminum containing reactant is added subsequent to the iron blue formation.

10. The method of claim 6 wherein the substrate is $TiO_2$ coated mica, the ferric ion reactant is ferric chloride, the ferrocyanide reactant is potassium ferrocyanide and the aluminum reactant is aluminum chloride.

11. The method of claim 10 including the step of drying the iron blue and aluminum hydroxide coated $TiO_2$ coated mica substrate.

* * * * *